(12) United States Patent
Kaczynski

(10) Patent No.: US 6,441,911 B1
(45) Date of Patent: Aug. 27, 2002

(54) MEASURING INSTRUMENT AND METHOD FOR MEASURING PATTERNS ON SUBSTRATES OF VARIOUS THICKNESSES

(75) Inventor: Ulrich Kaczynski, Bad Nauheim (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 13 days.

(21) Appl. No.: 09/685,086

(22) Filed: Oct. 11, 2000

(30) Foreign Application Priority Data

Oct. 11, 1999 (DE) .......................................... 199 49 019

(51) Int. Cl.[7] .............................................. G01N 21/00

(52) U.S. Cl. ..................... 356/615; 356/614; 356/239.3; 250/559.29

(58) Field of Search ................................. 356/614, 615, 356/239.1, 239.3, 239.4, 237.2, 237.5, 394; 250/559.29, 559.44

(56) References Cited

U.S. PATENT DOCUMENTS

| | | | | |
|---|---|---|---|---|
| 4,573,798 A | * | 3/1986 | Fujie et al. | .................. 356/432 |
| 5,786,897 A | | 7/1998 | Ototake | |
| 6,323,953 B1 | * | 11/2001 | Blaesing-Bangert et al. | ..... 356/614 |

* cited by examiner

*Primary Examiner*—Frank G. Font
*Assistant Examiner*—Roy M. Punnoose
(74) *Attorney, Agent, or Firm*—Crowell & Moring LLP

(57) ABSTRACT

A measuring instrument and a method for measuring patterns on substrates of various thicknesses are described. The measuring instrument comprises an X-Y carriage in which an opening is defined by a peripheral rim. An illumination optical system and multiple optical compensation elements serve to illuminate the measurement region. Multiple storage compartments for the optical compensation elements are shaped on the peripheral rim of the opening of the X-Y carriage. The optical compensation element needed in each case can be removed by the illumination optical system from the associated storage compartment.

14 Claims, 5 Drawing Sheets

US 6,441,911 B1

MEASURING INSTRUMENT AND METHOD FOR MEASURING PATTERNS ON SUBSTRATES OF VARIOUS THICKNESSES

CROSS REFERENCE TO RELATED APPLICATIONS

This invention claims priority of a German filed patent application 199 49 019.8.

FIELD OF THE INVENTION

The invention concerns a measuring instrument for measuring patterns on substrates of various thicknesses, the measuring instrument comprising an X-Y carriage in which an opening is defined by a peripheral rim, an illumination optical system, and multiple optical compensation elements.

The invention furthermore concerns a method for measuring patterns on substrates of various thicknesses.

BACKGROUND OF THE INVENTION

Substrates, also called masks, that are to be measured in transmitted light have different thicknesses. Substrates that can be measured in the measuring instrument must meet the SEMI Standard (SEMI P1-92 © SEMI 1981, 1999). Examples thereof are quartz masks of type 6025 (6×6 inches and 0.25 inches thick) or type 5009 (5×5 inches and 0.09 inches thick), or the quartz mask with dimensions 230× 230×9 millimeters. The standardized thicknesses used by semiconductor manufacturers are 2.3 mm, 3.2 mm, 6.35 mm, and 9 mm. In order to obtain identical measurement conditions (and thus comparable measurement results) for all substrate thicknesses, the optical path length of the measurement beam through the material of the substrate (quartz) must be identical for all substrate thicknesses. The optical system is therefore designed for quartz glass 9 mm thick. When thinner substrates are measured, compensation elements are inserted into the beam path so that the total optical path length achieved is always the same.

U.S. Pat. No. 5,786,897 discloses a method and an apparatus for determining the coordinates of patterns on the surface of a substrate. The apparatus comprises a carriage, movable in X and Y directions, on which is provided a transparent substrate with the pattern to be measured facing downward. A detector device is mounted above the substrate. Interferometers are provided for the X axis and the Y axis, so that the position of the carriage in the X-Y plane can be determined therewith. In order to allow substrates of different thicknesses to be measured, a compensation means for the optical path must be provided. The compensation means comprises a cross-shaped plate in which, for example, four glass elements are provided. The appropriate glass element for the thickness measurement of the substrate is brought into the beam path by rotating the disk. Rotation of the disk can be accomplished by way of a motor or a drive belt. Because of the location of the motorized drive system, a heat source is located in the vicinity of the measurement point, resulting in a degradation in the reproducibility of the measurement. In addition, a great deal of space is needed to accommodate and to move the turret or slider.

SUMMARY OF THE INVENTION

It is the object of the invention to create a measuring instrument for measuring patterns on substrates that furnishes reproducible measurement results and also reduces to the greatest extent possible all heat sources present in the measurement region of the measuring instrument. In addition, the design is intended to be as space-saving as possible.

The object is achieved by a measuring instrument which is characterized in that multiple storage compartments for the optical compensation elements are shaped on the peripheral rim of the opening of the X-Y carriage; and that the optical compensation element needed in each case can be removed by the illumination optical system from the associated storage compartment.

A further object of the invention is to create a method with which multiple optical compensation elements can be brought into the beam path of a measuring instrument without thereby influencing the reproducibility of the measurement.

This object is achieved, according to the present invention, in that the method is characterized by the following steps:

determining the substrate type used for the measurement;

displacing the X-Y carriage in such a way that the illumination optical system is positioned beneath the selected compensation element;

raising the illumination optical system and thereby picking up the compensation element; and displacing the X-Y carriage into the measurement region of the substrate and positioning the illumination optical system, together with the compensation element, in the measurement position.

Advantageous developments are evident from the features of the dependent claims.

With the configuration of the measuring instrument according to the present invention, it is possible to furnish reproducible measurement results and also to exclude the disruptive influence of the motor system for changing the compensation elements. The compensation elements are stored in storage compartments in the substructure of the X-Y carriage. The displacement region of the X-Y carriage is larger than the measurement region in transmitted light. The measurement region corresponds approximately to the opening that is defined in the X-Y carriage. As a result, it is possible for the X-Y carriage itself to move to the corresponding positions and pick up the compensation elements. To prevent incorrect compensation elements from being loaded and thus possibly resulting in damage to the substrate (if the compensation element that is loaded is too thick) or errors in measurement accuracy (if too thin a compensation element is loaded), the compensation elements are coded. For that purpose, the shapes (geometry) are configured such that only the correct compensation fits in each case into the corresponding location. The movement mechanism of the condenser is used to raise the compensation element. A further advantage is achieved with the method according to the present invention, with which it is possible to bring various optical compensation elements into the beam path of the measuring instrument.

BRIEF DESCRIPTION OF THE DRAWINGS

The subject matter of the invention relating to the measuring instrument is depicted schematically in the drawings and will be described below with reference thereto. In the drawings.

DETAILED DESCRIPTION OF THE INVENTION

Figure 1:
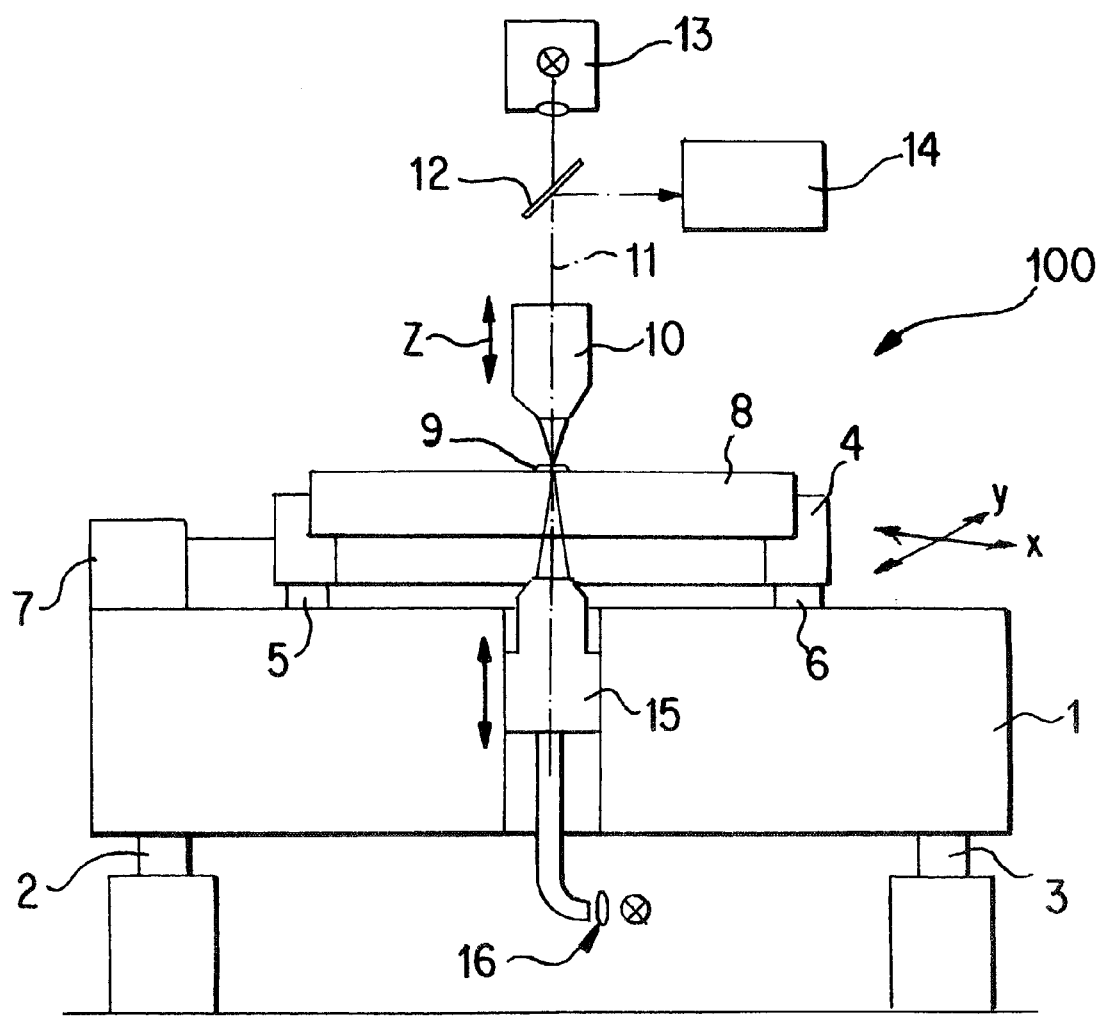
FIG. 1 shows a schematic side view of the measuring instrument.

The highly accurate measuring instrument 100 depicted in FIG. 1 comprises a granite block 1 that is mounted in vibration-damped fashion on bases 2, 3. On granite block 1, an X-Y carriage 4 configured as a frame is slidingly displaceable on air bearings 5, 6 in the two directions indicated by arrows. The frame of X-Y carriage 4 is preferably made of a glass ceramic with a low coefficient of thermal expansion. The drive systems for it are not depicted. The position of X-Y carriage is measured in the X and Y directions with a laser interferometer system 7.

A substrate 8 is introduced into the frame of X-Y carriage 4. Substrate 8 is made, for example, of quartz glass. Patterns 9 are present on the substrate surface. Since X-Y carriage 4 is configured as a frame, substrate 8 can also be transilluminated from below. For substrates that are opaque, incident illumination is then used. The description hereinafter is limited to the illumination of light-transmissive substrates. This is not to be construed in any way as a limitation of the invention.

Located above substrate 8 is an imaging system 10 of high optical quality that is adjustable in the Z direction along its optical axis 11 for focusing. By way of a beam-splitter mirror 12, on the one hand the light of a light source 13 is introduced into the optical beam path, and on the other hand the imaging beams are directed onto a detector device 14. Detector device 14 is, for example, a CCD camera having a high-resolution pixel array. Light source 13 emits in the near UV spectral region.

Set into granite block 1 is a further illumination device that comprises an adjustable-height condenser 15 and a light source 16. The exit surface of a light guide can also be provided as light source 16. The optical axis of condenser 15 is aligned with optical axis 11 of imaging system 10. The height adjustment of condenser 15 with light source 16 is used to adapt the illumination beams being directed onto pattern 9 to different optical thicknesses of different substrates 8. The condenser head can, in particular, extend into the open part of the frame of X-Y carriage 4. In order to prevent damage during stage displacements over the entire substrate surface, it can be pulled beneath the surface of granite block 1. Light sources 13 and 16 can be activated independently of one another.

Figure 2:
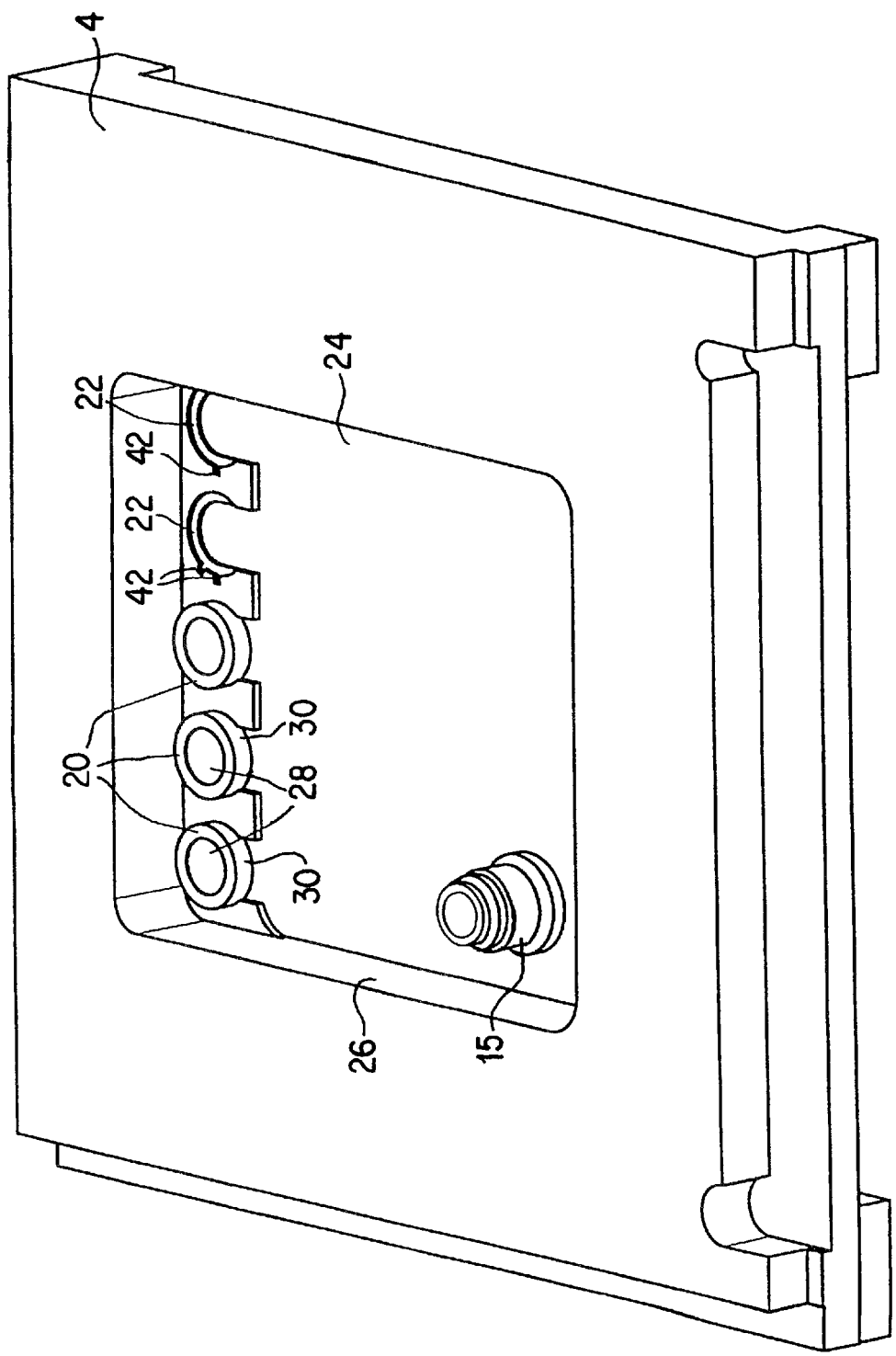
FIG. 2 shows a perspective depiction of the X-Y carriage with the compensation elements placed therein.

FIG. 2 shows a perspective depiction of X-Y carriage 4 in which multiple compensation elements 20 are placed in storage compartments 22 provided for them. Several components of the measuring instrument have been omitted from this depiction in order, for the sake of simplicity, to provide a better impression of what is essential to the invention. An opening 24 which defines a peripheral rim 26 is configured in X-Y carriage 4. Storage compartments 22 are configured along peripheral rim 26. Condenser 15 is provided in the region of opening 24. The condenser is stationary, i.e. it cannot be displaced in the movement plane of X-Y carriage 4. X-Y carriage 4, which at the same time is also the measurement stage of measuring instrument 100, possesses a displacement travel of sufficient size that condenser 15 can reach every point within opening 24. The compensation elements are made of glass plates 28 that are secured in a mount 30. Substrates 8 that are measured in transmitted light occur in various thicknesses. The thicknesses of substrates 8 that typically occur are 2.3 mm, 3.2 mm, 6.35 mm, and 9 mm (SEMI standard). In order to achieve identical measurement conditions (and thus comparable measurement results) for all substrate thicknesses, the path length of the optical measurement beam through the material of substrate 8 (quartz) must be identical for all substrates. The illumination optical system (condenser 15) is therefore designed for the thickest substrate. When thinner substrates are measured, compensation elements are brought into the beam path so that the resulting total optical path length through the substrate is always the same.

Figure 3:
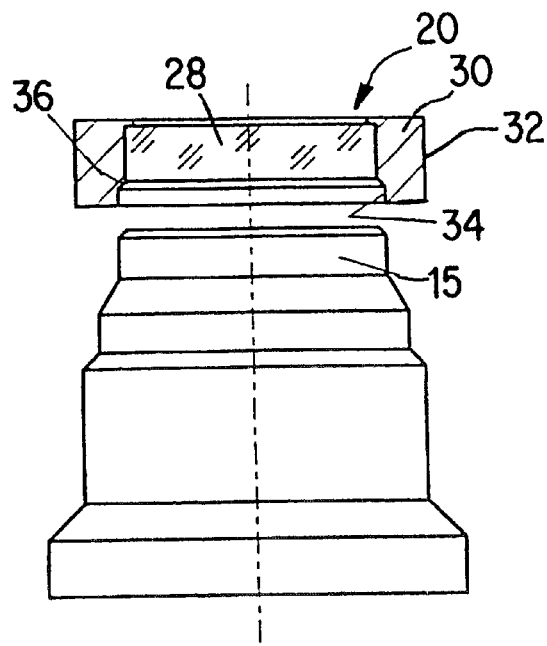
FIG. 3 shows a cross section through a compensation element and through the condenser, in order to depict the mechanical placement of the compensation element on the condenser.
Figure 5A:
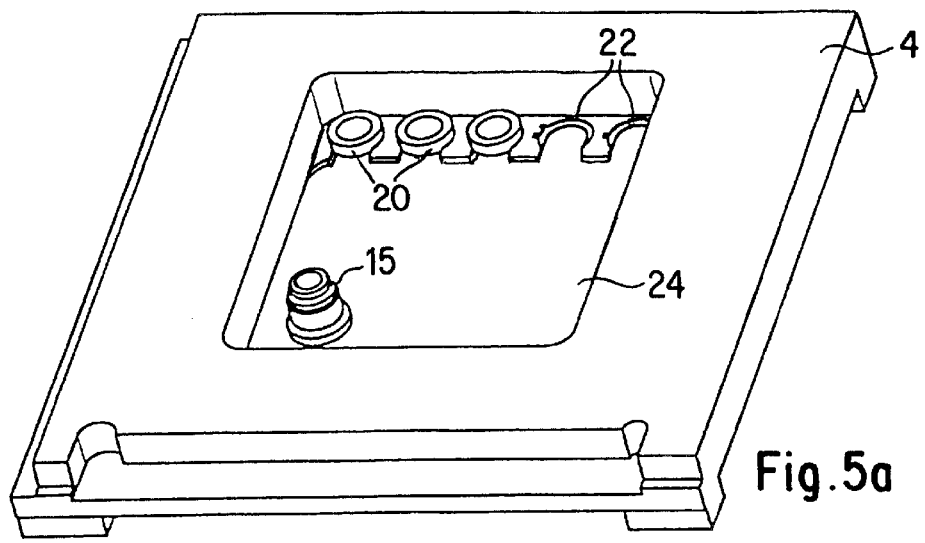
FIGS. 5a through 5c show a graphic depiction of the individual phases of removal of a compensation element from one of the storage compartments.
Figure 5B:
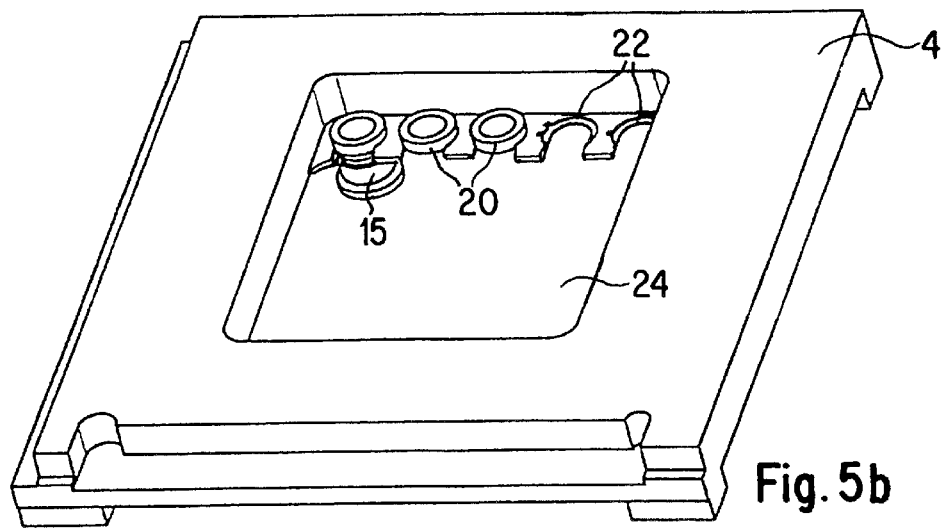
Figure 5C:
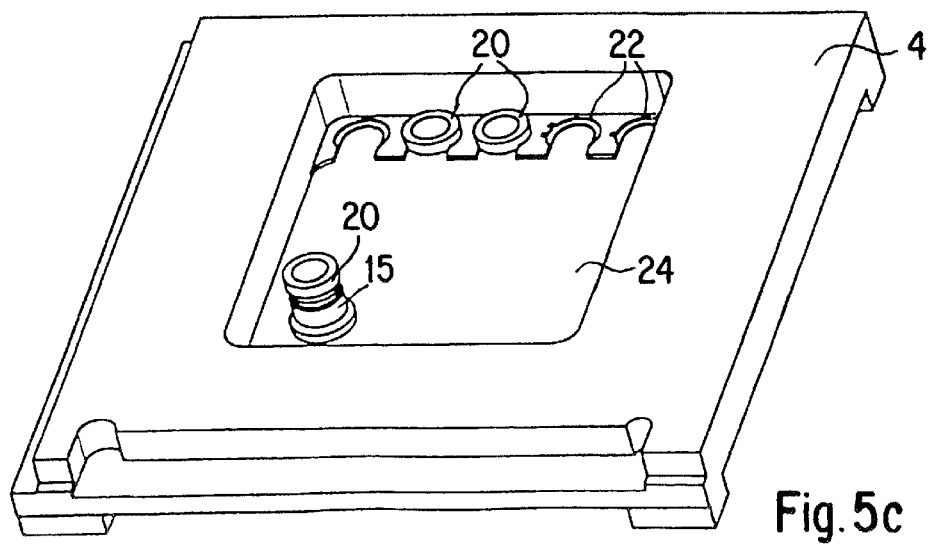

FIG. 3 shows a cross section through a compensation element 20 and through condenser 15 in order to illustrate the mechanical placement of compensation element 20 on condenser 15. Condenser 15 is used to remove compensation elements 20 from their storage compartments (FIGS. 5a through 5c provide an exact description of this). Glass plates 28 are secured in a mount 30. Mount 30 has the shape of a hollow cylinder with an outer wall 32 and an inner wall 34. Configured on inner wall 34 is a peripheral rim 36 on which glass plate 28 rests and is secured. The inside diameter of mount 30 is dimensioned such that it is slightly larger than the outside diameter of condenser 15. In addition, there is configured on inner wall 34 of mount 30 a profile which guarantees that compensation element 20 fits in secure and centered fashion on condenser 15.

Figure 4:
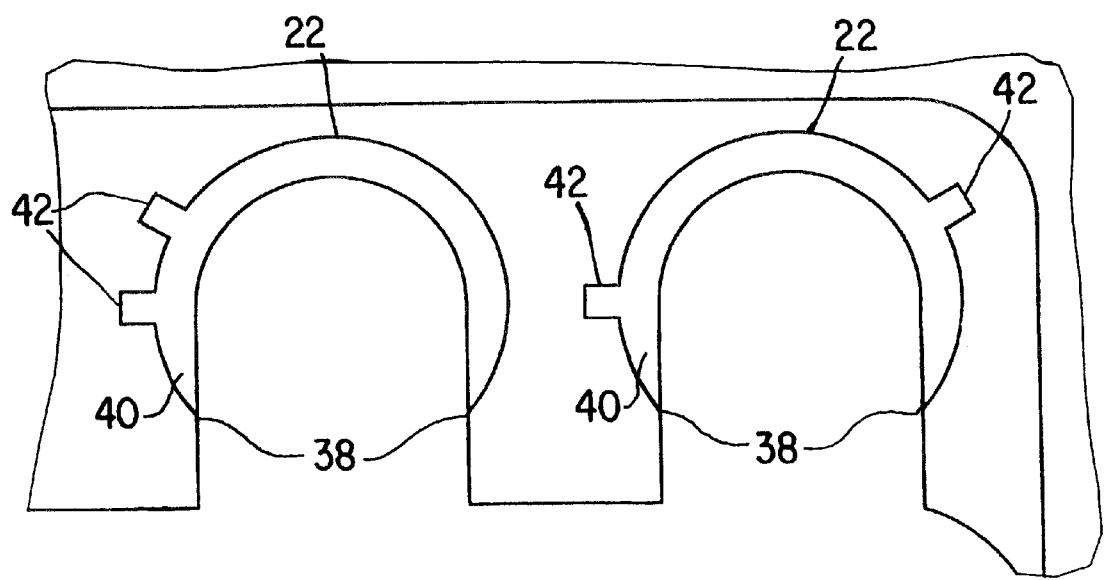
FIG. 4 shows an exemplary embodiment of the configuration of the storage compartments for the optical compensation elements.

FIG. 4 shows an exemplary embodiment of the configuration of storage compartments 22 for optical compensation elements 20. Storage compartments 22 are of circular configuration. A taper 38 of storage compartments 22 toward opening 24 of the X-Y carriage is present. Taper 38 prevents compensation elements 20 from falling out of storage compartments 22. A support surface 40 which carries compensation element 20 is shaped along the rim of storage compartments 22. To ensure that the same compensation elements 20 are always placed into the same storage compartments 22, a code is applied to compensation elements 20. In the present exemplary embodiment the code is mechanical. For this purpose, for instance, notches 42 are configured on storage compartments 22. The arrangement and distribution of the notches is different from one storage compartment 22 to another. A code is also provided on compensation element 20 so that correct allocation is guaranteed. It is self-evident that the configuration of the code presented here is in no way to be construed as a limitation.

The removal of a compensation element 20 is depicted in FIGS. 5a through 5c. As depicted in FIG. 5a, compensation elements 20 are deposited in storage compartments 22 provided for them. Condenser 15 is located in the region of opening 24 of X-Y carriage 4. If a compensation element 20 is necessary due to the thickness of the substrate being measured (see FIG. 5b), X-Y carriage 4 moves in such a way that condenser 15 is positioned beneath storage compartment 22 of the requisite compensation element 20.

Figure 6:
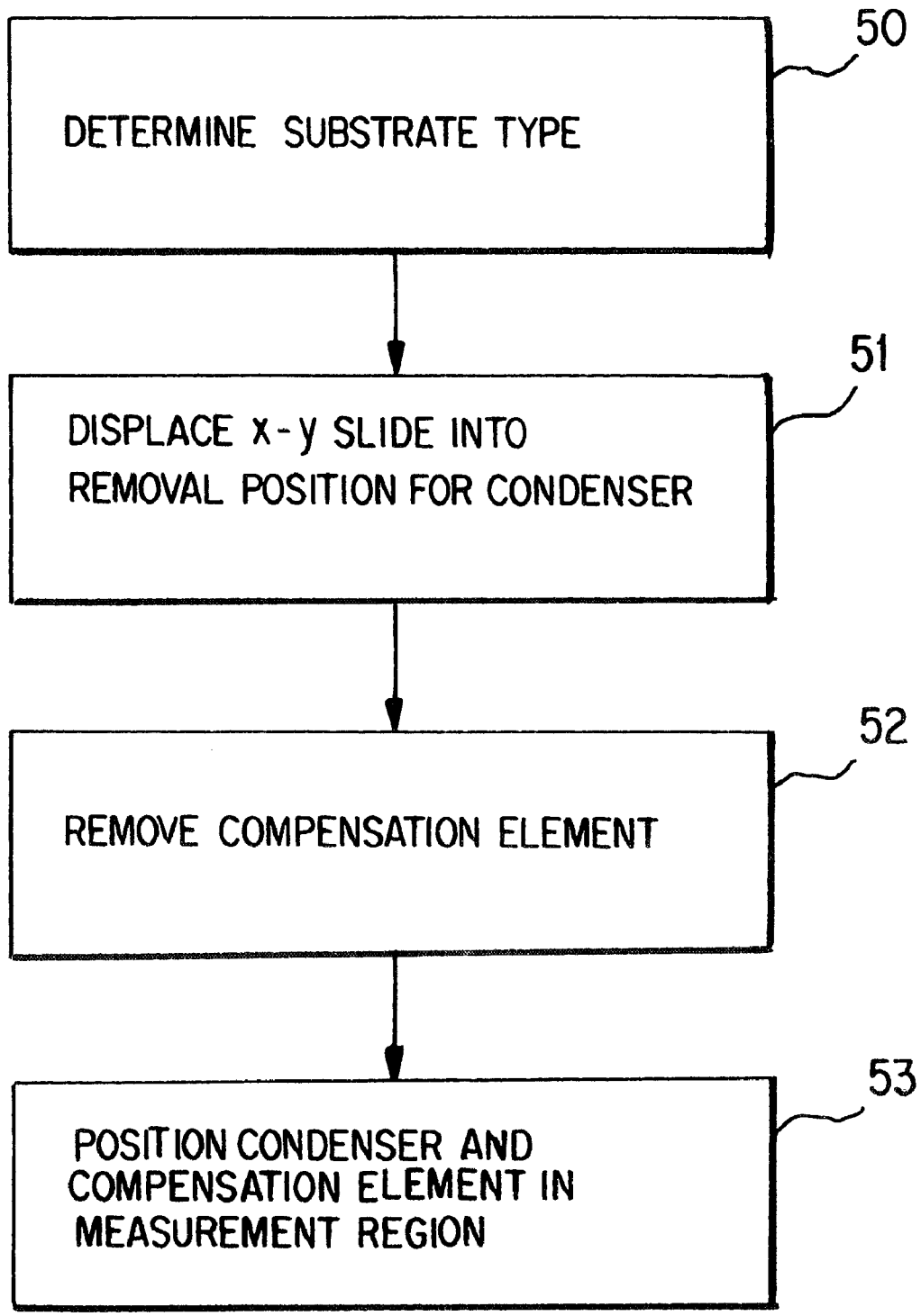
FIG. 6 shows a flow chart depicting the method according to the present invention.

Condenser 15 is raised in the Z direction (perpendicular to the movement plane of X-Y carriage 4), thus causing compensation element 20 to be lifted off from storage compartment 22. In FIG. 5c, when compensation element 20 is resting on condenser 15. the X-Y carriage is displaced in such a way that the unit made up of condenser 15 with compensation element 20 is removed from storage compartment 22. The unit made up of condenser 15 with compensation element 20 is then located in the region of opening 24. FIG. 6 shows a flow chart for performing the method according to the present invention. In a first step 50, the substrate being used for the measurement is determined. The measurement results of sensors (not depicted) can be used for this purpose to furnish the requisite information. Once it is known which substrate type is presently to be measured, this information is used to displace X-Y carriage 4 in such a way that compensation element 20 matching substrate 8 is removed. X-Y carriage 4 travels to the position of that storage compartment 22 in which the corresponding compensation element 20 is located, so that condenser 15 is positioned exactly beneath compensation element 20. In a further step 52, condenser 15 is raised. The movement of condenser 15 is perpendicular to the movement plane of X-Y carriage 4. Compensation element 20 is thereby lifted up out of its storage compartment 22 and comes to rest on condenser 15. In a subsequent step 53, X-Y carriage 4 moves into the measurement region of substrate 8. In that context, condenser 15 together with compensation element 20 is moved away from storage compartment 22 and positioned in the measurement position. Condenser 15 together with compensation element 20 is then located in the region of opening 24 of X-Y carriage 4.

The present invention was described with reference to exemplary embodiments. It is nevertheless apparent to any person skilled in this art that changes and modifications can be made without thereby leaving the range of protection of the claims recited below.

PARTS LIST

1 Granite block
2 Base
3 Base
4 X-Y carriage
5 Air bearing
6 Air bearing
7 Laser interferometer
8 Substrate
9 Patterns
10 Imaging system
11 Optical axis
12 Beam-splitter mirror
13 Light source
14 Detector device
15 Adjustable-height condenser
16 Light source
20 Compensation elements
22 Storage compartments
24 Opening
26 Peripheral rim
28 Glass plate
30 Mount
32 Outer wall
34 Inner wall
36 Peripheral rim
38 Taper
40 Support surface
42 Notches
50 First step
51 Second step
52 Third step
53 Fourth step
100 Measuring instrument

What is claimed is:

1. A measuring instrument (100) for measuring patterns (9) on substrates (8) of various thicknesses, comprising an X-Y carriage (4) in which an opening (24) is defined by a peripheral rim (26), an illumination optical system (15), and multiple optical compensation elements (20), wherein multiple storage compartments (22) for the optical compensation elements (20) are shaped on the peripheral rim (26) of the opening (24) of the X-Y carriage (4); and the optical compensation element (20) needed in each case can be removed by the illumination optical system (15) from the associated storage compartment (22).

2. The measuring instrument as defined in claim 1, wherein the measurement of patterns (9) on substrates (8) is accomplished in transmitted light.

3. The measuring instrument as defined in claim 1, wherein the X-Y carriage (4) is simultaneously usable as a measurement stage for measuring the substrates (8).

4. The measuring instrument as defined in claim 1, wherein the illumination optical system (15) comprises a condenser that is adjustable by a movement mechanism perpendicular to the movement direction of the X-Y carriage (4); and the X-Y carriage (4) moves the storage compartments (22) with the optical compensation elements (20) into a removal position.

5. The measuring instrument as defined in claim 1, wherein the storage compartments (22) are configured such that the compensation elements (20) lie conformingly in the storage compartments (22).

6. The measuring instrument as defined in claim 5, wherein the compensation elements (20) are equipped with a code.

7. The measuring instrument as defined in claim 1, wherein the storage compartments (22) for the compensation elements are arranged linearly along the rim (26) of the opening (24).

8. The measuring instrument as defined in claim 1, wherein each removed compensation element (20) rests on the condenser (15).

9. The measuring instrument as defined in claim 1, wherein the compensation elements (20) are configured such that they compensate for the optical path lengths due to the different substrate thicknesses.

10. A method for measuring patterns (9) of substrates (8) of various thicknesses, characterized by the following steps:

determining the substrate type (8) used for the measurement;

displacing an X-Y carriage (4) in such a way that an illumination optical system (15) is positioned beneath the selected compensation element (20);

raising the illumination optical system (15) and thereby picking up the compensation element (20); and displacing the X-Y carriage (4) into the measurement region of the substrate (8) and positioning the illumination optical system (15), together with the compensation element (20), in the measurement position.

11. The method as defined in claim 10, wherein the illumination optical system (15) comprises a condenser that is adjustable by a movement mechanism perpendicular to the movement direction of the X-Y carriage (4).

12. The method as defined in claim 10, wherein once the substrate type for the measurement has been determined, the compensation element (20) necessary for compensation for the optical path length is selected; and the position of the selected compensation element (20) in the storage compartment (22) is determined.

13. The method as defined in claim 10, wherein the determination of the substrate used is accomplished on the basis of measurement results of sensors; and the drive system of the X-Y carriage (4) is thereby controlled in such a way that the compensation element (20) matching the substrate (8) is removed.

14. The method as defined in claim 10, wherein the measurement of substrates (8) is performed in transmitted light.

* * * * *